United States Patent [19]

Daniels et al.

[11] 3,882,195
[45] May 6, 1975

[54] PRE-EMULSIFICATION-DELAYED INITIATION SUSPENSION PEARL POLYMERIZATION PROCESS

[75] Inventors: Wiley E. Daniels, Easton; Dewey G. Holland, Chadds Ford; Gerald J. Mantell, Allentown, all of Pa.

[73] Assignee: Air Products and Chemicals, Inc., Allentown, Pa.

[22] Filed: May 16, 1973

[21] Appl. No.: 360,835

[52] U.S. Cl............... 260/878 R; 260/29.6 MM; 260/29.6 RB; 260/29.6 TA; 260/92.8 W; 260/836; 260/884; 260/885; 260/886
[51] Int. Cl........................ C08f 15/00; C08f 19/00
[58] Field of Search .......... 260/878, 884, 19.6 RB, 260/92.8 W

[56] References Cited
UNITED STATES PATENTS

| | | | |
|---|---|---|---|
| 3,189,583 | 6/1965 | McCaw | 260/86.1 R |
| 3,332,918 | 7/1967 | Benetta et al. | 260/29.6 RB |
| 3,502,745 | 3/1970 | Minton | 260/29.6 RB |
| 3,742,092 | 6/1973 | Duke et al. | 260/29.6 RB |
| 3,769,151 | 10/1973 | Knutson et al. | 260/878 R |

FOREIGN PATENTS OR APPLICATIONS

| | | | |
|---|---|---|---|
| 627,265 | 8/1949 | United Kingdom | 260/29.6 RB |

*Primary Examiner*—Murray Tillman
*Assistant Examiner*—Michael B. Turer
*Attorney, Agent, or Firm*—Richard A. Dannells, Jr.; Barry Moyerman

[57] ABSTRACT

A process for preparing vinyl chloride based polymers by suspension polymerization provides granular products characterized by improved uniformity of particle size, high porosity and rapid fushion rates. Pre-emulsification of vinyl chloride in the presence of a polyvalent metal ion, a surface active agent and a "seed" polymer, subsequently polymerized by the after-addition of initiator offers a high degree of control over physical properties of the resulting polymer that are also consistently reproducible. By addition of surfactants during the course of polymerization stability is improved. The combination of pre-emulsification, delayed initiation and post addition of surfactant substantially eliminates reactor wall fouling and crust formation.

17 Claims, No Drawings

PRE-EMULSIFICATION-DELAYED INITIATION SUSPENSION PEARL POLYMERIZATION PROCESS

BACKGROUND OF THE INVENTION

The present invention relates to a process of suspension polymerization also known as "pearl polymerization" whereby vinyl chloride based polymers, such as vinyl chloride homopolymers (PVC) and copolymers containing vinyl chloride and other comonomers are prepared. More specifically, the processes described herein concern the polymerization of monomers, such as vinyl chloride, by an improved suspension method in which the monomer(s) is first preemulsified to form a stable dispersion of monomer in water. A free-radical initiator is then added to the previously emulsified monomer-containing reaction mixture to bring about polymerization.

Emulsification of monomer(s) and delayed initiation are achieved by agitation of the monomer(s) at or near the intended polymerization temperature, the monomer(s) being dispersed in the aqueous phase, which comprises a mixture of a salt of a polyvalent metal, a surfactant and a "seed" polymer. The seed may be a polymeric material soluble in the monomer and is capable of stabilizing the aqueous emulsion. Polymerization can be initiated by addition of oil-soluble free radical generating substances miscible in the monomer phase of the dispersion. Polymerization proceeds until the desired degree of conversion is reached. The final resinous products are characterized by consistently high porosity, uniform size particles and rapid fusion rates. Furthermore, polymer crust formation and "buildup" on reactor walls is substantially diminished. Advantageously, the process of the instant invention offers a means for preparing resins with granules of batch-to-batch uniformity.

Vinyl based monomers, such as vinyl chloride may be polymerized by suspension, solution, emulsion and bulk processes. In conventional suspension type systems water, monomer, polymerization initiator, including emulsifier, protective colloids and other modifiers, depending on the type of monomers involved are charged to a reactor and polymerization proceeds without delay. The monomer or mixture of monomers are dispersed in the aqueous phase, in which both monomer and polymer are essentially insoluble. The polymerization initiator is generally soluble in the monomer phase. The resulting polymers occur in the form of pearls, beads, soft spheres or irregular granules, particularly when initiator is present in the dispersion in the beginning steps of the process.

U.S. Pat. Nos. 2,981,724; 3,057,831; and 3,063,977 disclose suspension polymerization processes for preparing large, uniformsized polyvinyl chloride pearls having high affinity for uniform sized In spite of the generally satisfactory properties of resins prepared with polymerization initiators present during emulsification of monomer(s), such earlier methods failed to provide control over resin particle size, as well as offering particle sizes having batch-to-batch uniformity. Furthermore, smaller particle size pearls (e.g., $100\mu$ or less) could not be manufactured by these processes.

More recent developments in suspension polymerization suggest pre-emulsified, seeded polymerization using conventional methods of initiation. Under certain conditions, smaller particle sizes may be prepared, however, batch-to-batch uniformity and broadness of particle size distribution were found to be less than satisfactory. Other methods, such as those described in British Pat. Nos. 978,875 and 1,102,980 rely on the use of separate mechanical means, whereby monomer and water are mechanically homogenized by use of colloid mills, ultra-sonic devices, and the like. In addition, such processes required large quantities of water soluble emulsifiers.

Furthermore, it was discovered that methods heretofore, intended for the production of fine particle size porous resins (e.g., $50\mu$ to $100\mu$) lead to crust formation and reactor wall fouling. In this regard, manufacturing fine, granular resins by suspension methods lead to the accumulation of layers of particles at the top walls of the reactor which hardened as the reaction progressed. Whether in the form of "scale" deposits on interior walls or crust layer of resinous material at the top of the reactor, polymer buildup hinders operating efficiency causing lower product yield. Furthermore, polymer buildup interferes with proper heat transfer thereby causing internal pressures to rise, endangering both equipment and operators.

Thus, it has now been discovered that by pre-emulsification of vinyl chloride based monomers directly in the reactor in the presence of a polymer seed, a salt of a polyvalent metal and reduced quantities of emulsifying surfactants, in the absence of a free-radical initiator (delayed-initiation), formation of a stable dispersion of monomer takes place, which can be subsequently initiated to produce large, as well as smaller size resinous particles that are porous in character, high in fusion rate and consistently uniform in size from batch-to-batch, all with minimal reactor buildup.

Accordingly, it is a principle object of the present invention to provide improved means for preparing vinyl chloride based polymers.

It is a further object of the instant invention to provide a suspension process for manufacturing vinyl chloride based polymers by means offering a high degree of predictably reproducible sizes of resinous pearls, beads, spheres or irregular shaped granules.

A still related object is to provide an improved suspension type process for preparing polymers having batch-to-batch uniformity in terms of particle size, porosity and fusion properties.

Yet, still another object of the instant invention is the preparation of vinyl chloride based polymers by means which offer a wide latitude of particle sizes without crust formation and reactor wall fouling.

These and other objects, features and advantages of this invention will become apparent to those skilled in the art after a reading of the following more detailed description.

PREFERRED EMBODIMENTS OF THE INVENTION

Broadly, the invention is directed to an improved method of preparing vinyl chloride based polymers wherein the monomer(s) is first pre-emulsified in the aqueous phase of the dispersion in the absence of free-radical initiator. Once a stabilized dispersion of the monomer has been prepared, polymerization is then initiated by means of free-radical catalyst.

In carrying out the process, vinyl chloride alone or with other comonomers is emulsified by agitation with an aqueous phase comprising a metal ion, a surfactant and more preferably an anionic type surface active agent and a polymer seed material. The metal ion is preferably polyvalent i.e., having a valence of at least 2, and may include such members as magnesium, calcium, zinc, strontium, aluminum, lead, antimony, tin, barium, cadmium, etc. A convenient source of such cations are various known salts of polyvalent metals, which for purposes of the present invention should be at least partially soluble in the aqueous phase of the emulsion system. A few representative examples of suitable salts of polyvalent metals are aluminum phosphate, magnesium sulfate, barium acetate, cadmium acetate, cadmium sulfate, zirconium sulfate, calcium acetate, calcium chloride, monocalcium phosphate, and the like. Calcium containing salts are preferred and especially those calcium salts that are soluble in water. Generally, polyvalent metal salts are used in a range from about 0.01 to about 0.30 parts per hundred parts monomer(s) (phr).

Surface active agents employed in the dispersion include a wide range of materials, such as, for example alkyl benzene sulfonates, mono and dialkyl phosphates, sulfated fatty alchols, esters of sulfosuccinic acid, etc. Surfactants falling within these foregoing groups are typically the $C_9$ to $C_{15}$-alkylbenzene sulfonates like decyl and dodecylbenzene sulfonates, diisobutyl naphthalene sulfonate and their respective salts which are available under such trade names as "Ultrawet" and "Sulframin." Other examples falling within the purview of the above groups are sodium lauryl sulfate, sodium tetradecyl sulfate, sodium pentadecyl sulfate, sodium octyl sulfate, mono and dilauryl phosphates, di(2-ethylhexyl) phosphate. Esters of sulfosuccinic acid are available under such trade names as "Aerosol OT" (sodium dioctyl ester) and "Monowet MO-70-E" (sodium diisobutyl ester). Numerous other succinic acid esters like di-tridecyl sodium and di-hexyl sodium are also adaptable to the subject-processes disclosed herein and are available through ordinary channels of commerce. The amount of surface active agent will generally range from about 0.01 to about 0.30 parts per hundred parts monomer(s).

As indicated above, the present invention entails use of a polymer seed in pre-emulsification of the monomer. Although some question remains, regulation of particle size of the resinous material produced herein is believed, at least, partially attributable to the presence of the polymer seed. For purposes of the present invention the term—polymer seed—includes latex type polymeric dispersions or emulsion polymers, as well as solid type polymers miscible in the monomer. During the pre-emulsification stage, the monomer is promptly emulsified in the aqueous phase of the dispersion. However, for this to occur it has been observed that sufficient polymer from the seed must first be dissolved in the monomer, and when the seed is a latex emulsion it will occur to an appreciable extent only when the latex is in a coagulated state.

As previously mentioned, the polymer seed used in preparation of monomer containing emulsions include polymers which are soluble in the monomer and capable of stabilizing the emulsion. They include both homopolymer and copolymer, solid and emulsion type containing two or more monomers, in the latter case. A few representative examples of useful seed polymers according to the present invention are homopolymers of styrene, vinyl acetate, methyl methacrylate, etc.; copolymers include among other vinyl acetate-ethylene, vinyl chloride-2-hexyl acrylate and vinyl chloride vinyl isobutyl ether. Also included are carboxylated terpolymers of vinyl chloride-2-ethyl hexyl acrylate. The latter copolymers as latices are especially preferred, providing highly stable emulsions and resinous particles that are uniform in size, highly porous in character and having rapid fusion rates, all produced with minimal reactor wall buildup and crust formation.

In practicing the instant process, dispersion type polymer seeds should be in a coagulated state in order to perform their emulsifying effect on the monomer(s). Coagulation of the latex polymer can be conveniently accomplished directly in the reaction mixture, in-situ, simultaneously during the pre-emulsification stage of the process. Here, the water soluble polyvalent metal containing salt dissociates to yield cations, which in turn react with the latex dispersion "stripping" it of its dispersing agent. As a result, the latex polymer coagulates altering or eliminating the original latex particles in the reaction mixture.

Although minor amounts of the coagulated polymer may adhere to walls of the reactor vessel, the greatest portion of latex, upon coagulation, dissolves in the monomer to form a stable, aqueous emulsion of the monomer. That small portion of coagulated latex from the polymer seed adhering to the walls of the vessel slowly dissolves in the monomer during agitation, leaving the walls virtually free of all polymer accumulation.

The surface active agent employed in the pre-emulsification step of the instant process also functions in the emulsification of the monomer, providing further means of securing stable, aqueous emulsions of monomer in water. In this instance, cations from the dissociated metal containing salts also react with the added surface active agent, thereby further lowering the surface tension of the dispersion mixture. Metal salts of the surface active agents, although insoluble in some cases, in the dispersion mixture together with the coagulated polymer latex provide an even further lowering of surface tension for more rapid emulsification of monomer.

Quantities of polymer seed employed in pre-emulsification of the monomer are generally a function of desired particle size of the final resinous material. That is to say, one can predictably regulate particle size by modifying the amount of seed added, so that granules ranging from about 25 up to 300$\mu$ or even higher may be prepared that have batch-to-batch uniformity. Ordinarily, by increasing the amount of seed in the dispersion, smaller particle sizes occur, and on the other hand, larger particles can also be prepared by reducing the amount of added seed. More specific quantities of polymer seed in a given system will naturally vary somewhat depending upon the monomer(s) involved. Determination of such amounts of latex for use with vinyl based monomers, as disclosed herein, are matters of routine determination, well within the purview of those possessing ordinary skill in polymerization technology, keeping in mind the seed quantity is inversely proportional to the particle size of the final resinous material desired. Nevertheless, it has been found in many instances that from about 0.2 to about 2.0 parts polymer seed per hundred parts monomer, and more preferably, from about 0.3 to about 1.2 parts polymer phr will provide resinous particles of the foregoing sizes. For example, homopolymers of vinyl chloride and copolymers of vinyl chloride-propylene prepared by suspension polymerization according to the method of the present invention require from about 0.9 to 1.1 parts of polymer seed per hundred parts of monomer for preparing fine pearl-like granules of about 50μ. Larger particle sizes of about 100 to 125μ can be prepared with from 0.35 to about 0.45 parts of polymer latex per hundred parts of monomer.

In order to promote formation of the desired preemulsion, after the reactor vessel has been filled with the aqueous charge comprising monomer, surface active agent, polyvalent metal containing salt and polymer seed the temperature may be adjusted to a more suitable level. Most frequently, the temperature will correspond to polymerization conditions whereby temperatures ranging from about 30° to about 75°C will be employed. However, most optimal temperatures in which to promote emulsification and later polymerization are from about 60° to 75°C. Advantageously, the mixture should be simultaneously agitated to secure a more even, homogenous emulsion over the shortest process time. There are no special requirements regarding agitation, however, the charge should be agitated in accordance with methods consistent with standard suspension polymerization procedures.

To initiate polymerization of the pre-emulsified monomer organic peroxides, redox catalysts, azo compounds and the like are then incorporated into the dispersion. Typical examples of peroxides adaptable for use in the disclosed process are benzoyl peroxide, chlorobenzoyl peroxide, lauroyl peroxide, capryl peroxide, acetyl peroxide, acetylbenzoyl peroxide, t-butyl hydroperoxide, t-butyl perneodecanoate, t-butyl peroxy pivalate, myristyl peroxide, etc. Typical azo-type catalysts, for example, are disclosed by Hunt in U.S. Pat. No. 2,471,959 and include compounds like 2,2'-azoisobutyronitrile, referred to in the art as "AIBN." Others include 2,2'-azo-bis(γ,γ-dimethyl)-valeronitrile, 2-(tert-butyl-azo)-2-phenyl propane, etc. Satisfactory rates of polymerization can be achieved through the use of about 0.05 to about 0.5 parts of catalyst per hundred parts monomer. As a result, conversion time may be minimized, however, cycle time will naturally vary depending on such factors as the amount and particular catalyst used, temperature at which polymerization is conducted, type of monomer and the like.

No further active ingredients, adjuvants and the like are required in the reaction mixture in order to obtain the desired resinous material in accordance with the objectives of the present invention. However, it has been observed that additional quantities of surface active agents added to the reaction mixture after polymerization has been initiated are beneficial, especially for purposes of improving suspension stability. With post-initiated addition of surfactants, crust formation at the surface of the mixture is more substantially eliminated thereby offering better temperature control during the process. In carrying out the procedure, the requisite quantity of surfactant may be incorporated directly into the emulsified mixture in a single step, but more preferably, it should be added either incrementally or by slow continuous addition as polymerization progresses.

Various types of surfactants can be readily employed in the above post-addition procedure, including those suggested earlier for use in pre-emulsification of the monomer. That is to say, anionic as well as non-ionic surface active agents offer added stability to the emulsion during polymerization. Further representative examples include the alkylphenol-alkylene oxide based derivatives (primarily polyethoxylated nonylphenols), fatty acid-alkanolamine condensates, tall oil, rosin and fatty acid alkylene oxide adducts. Representative examples include inter alia octyl, nonyl and dodecyl phenols containing 50 and up to 95 percent polyoxyethylene. Polyoxyethylene fatty acid esters include mono, di and polyglycol esters of oleic, lauric, stearic, abietic acids, etc. Carboxylic amides include both the mono and diethanolamine condensates such as coco, lauric, oleic and stearic acids. Post addition of surface active materials to the polymerizing mixture are generally in amounts ranging from about 0.05 to about 0.2 parts per hundred parts monomer, and more optimally, from about 0.07 to about 0.12 phr.

The amount of water used in the process is that which is sufficient to accommodate the various components of the system and to support the resulting resinous material in the conventional manner. Thus, ordinarily the suspension contains about 100 to 400 percent water, based upon the weight of the monomer(s). The suspension process disclosed herein is conducted at a pH of about below 7, and more specifically, at about 2 to about 7. In most instances, pH will desirably be from 3 to 5. Should any adjustment be needed, acids, such as hydrochloric, sulfuric, phosphoric and acetic acids, etc., may be used.

Although the described processes find wide use in the preparation of a broad range of vinyl based polymers, the instant invention is specially adaptable to manufacturing vinyl chloride based polymers, which for purposes of this invention denote both homopolymers and copolymers having two or more monomers, such as polyvinyl chloride (PVC), polyvinylidene chloride and copolymers containing vinyl chloride and other comonomers like vinyl acetate, acrylate and methacrylate esters. Usual methacrylates will ordinarily include, for example, methyl, ethyl, butyl, lauryl and stearyl and the acrylates include such members as methyl, ethyl, butyl and 2-ethyl hexyl. Included along therewith are copolymers of vinyl chloride and various olefins like ethylene, isobutylene and propylene, the latter of which as described in U.S. Pat. No. 3,468,858. The copolymers disclosed therein are characterized as having from about 90 to 99 percent by weight vinyl chloride and a propylene content of 1 to about 10 percent by weight, and preferably 2 to 8 percent by weight, an intrinsic viscosity (IV) of 0.5 to 1.5 dl/g., and more preferably an IV of about 0.3 to about 1.5 dl/g. and a melt flow rate of at least 0.1 dg/min.

Minor amounts, generally less than 5 phr, of functional group containing comonomers, such as acrylic acid, methacrylic acid, N-methylol acrylamide, acrylonitrile, 2-(t-butyl) aminoethylmethacrylate, 2-(hydroxyethyl) methacrylate, glycidylmethacrylate, etc., may be included in the monomer(s) previously described, in order to provide the finished copolymer with cross-linking sites, thermosetting character and improved adhesion to substrates.

As mentioned immediately above, the disclosed processes are particularly adaptable to the preparation of vinyl chloride based polymers, however, other vinyl based homo and copolymers may also be manufactured accordingly. They include polymers of other vinyl halides, alcohols, esters and ethers, such as vinyl fluoride, vinyl alcohol, vinyl acetal, vinyl butyral, vinyl formal, vinyl laurate, vinyl myristal ether, vinyl lauryl ether, and the like.

The following specific examples demonstrate the processes of the instant invention, however, it is to be understood that these examples are for illustrative purposes only and do not purport to be wholly definitive as to conditions and scope.

EXAMPLE I

RUN A

A 1.5 liter Chemco glass reactor was charged in the following order:

|  | Parts/100 parts monomer (phr) |
|---|---|
| Water | 200.0 |
| Vinyl Chloride/2-ethyl hexyl acrylate copolymer (Geon 450X3) | 0.2 |
| Dodecylbenzene sulfonic acid-triethanolamine salt (Ultra-Wet 60) 10% solution | 0.1 |
| Mono-basic Calcium Phosphate, aqueous solution (16% by weight) | 12.5 |
| Vinyl Chloride | 100.0 |
| Trichloroethylene | 1.0g |
| Lauroyl peroxide | 0.2g |

Once all ingredients were added except for the vinyl chloride, trichloroethylene and initiator the reactor was closed, evacuated and flushed with nitrogen. This procedure was repeated two additional times. The vinyl chloride was then added to the reactor and the reaction mass heated to 60°C with constant agitation at 350 rpm. Agitation was terminated and the vinyl chloride separated from the aqueous phase. The reaction mixture was agitated at 1,050 rpm for about 5 minutes and agitation was stopped again. It was observed that the vinyl chloride monomer no longer separated, but remained emulsified. The stirrer was actuated at 350 rpm and both the lauroyl peroxide and trichloroethylene were added as a common solution to the reaction mixture by means of pressure bomb technique. Polymerization was conducted for 18 hours at 147 psig. At the end of the cycle the batch was cooled and unreacted monomer vented. The polymer slurry was filtered, washed and dried to constant weight in a circulating air oven at 50°C. There were 196.5 parts granular polyvinyl chloride and 5.3 parts polymer coagulated on the reactor walls and agitator.

RUN B

For purposes of comparison the same ingredients as in Run (A) were also charged into a 1.5 liter glass reactor, however, the trichloroethylene and lauroyl peroxide initiator were added initially with the rest of the reaction mixture in the conventional manner. After purging the reactor according to Run (A) the vinyl chloride was charged and the batch heated to 60°C with agitation at 350 rpm. Polymerization proceeded for 20 hours with the pressure falling from 147 to 50 psig at the end of the cycle. The polymer slurry was filtered, washed and dried in accordance with Run (A). There were 174 parts polyvinyl chloride and 13.6 parts polymer remaining on reactor walls and agitator. Comparisons of Runs (A) and (B) are shown in Table I below:

TABLE I

| RUN | A | B |
|---|---|---|
| % Conversion | 97 | 85 |
| % Wall Fouling | 2.7 | 7.0 |
| Median particle size (microns) | 250 | 354 |
| Bulk density (lbs/ft$^3$) | 23 | 33.8 |

Higher yield, lesser reactor wall fouling, smaller particle size and lower bulk density (Table I) occuring with Run (A) than Run (B) demonstrates the importance of delayed initiation when pre-emulsifying with the aid of seed polymer.

EXAMPLE II

Two 1.5 liter Chemco glass reactors were charged in the following order:

| Initial Charge | RUNS phr C | D |
|---|---|---|
| Water | 230 | 230 |
| Sodium Salt of dodecylbenzene sulfonic acid (Sulframin 85) | 0.09 | 0.09 |
| Monobasic Calcium Phosphate, aqueous solution (16% by wt.) | 0.26 | 0.26 |
| Vinyl Chloride/2-ethyl hexyl acrylate copolymer (Geon 450X3) | 1.1 | 1.1 |
| Trichloroethylene | 0.0 | 0.8g |
| Lauroyl peroxide | 0.0 | 0.1g |
| Vinyl chloride | 100.0 | 100.0 |

Run (C) was prepared by the method of Example I, Run (A). 0.16g lauroyl peroxide in trichloroethylene were added to the reaction mixture to initiate polymerization after the monomer was first emulsified in the presence of the seed polymer, "Geon" 450X3. However, Example II (Runs C and D) employed about 5 times more seed than used in Example I.

For purposes of comparison, Run (D) was prepared by the process of Example I, Run (B) where polymerization was initiated without delay, in the conventional manner. Reaction temperatures for both Runs (C) and (D) were 60°C and cycle times were 18 hours.

Comparison between Runs (C) and (D) are shown in Table II below:

TABLE II

| RUNS | C | D |
|---|---|---|
| % Conversion | 84 | 83 |
| % Wall Fouling | 5.0 | 9.5 |
| Median particle size (microns) | 53 | 149 |
| Bulk density (lbs/ft$^3$) | 25 | 23.0 |

Table II illustrates that finer particle sizes may be prepared through use of higher levels of seed polymer vis-a-vis Table I. Moreover, Run (C) of Table II prepared by pre-emulsification and delayed-initiation provided even finer particle sizes than Run (D) initiated in the conventional manner with approximately one-half (1/2) the reactor wall buildup.

EXAMPLE III

The following compositions were prepared in a 500 gallon Pfandler pilot plant reactor.

RUN E

Delayed Initiation

| | Phr |
|---|---|
| Water | 200.0 |
| Sodium salt of dodecylbenzene Sulfonic acid (Sulframin −85) | 0.9 |
| Monobasic calcium phosphate | 0.26 |
| Vinyl Chloride/2-ethyl hexyl acrylate (Geon 450×3) | 1.1 |
| Trichloroethylene | 0.8g |
| Lauroyl peroxide | 0.16g |
| Vinyl Chloride | 100.00 |

All ingredients for Run (E) but for the initiator system were charged to the reactor according to the procedure outlined in Example I, Run (A). Temperature of the mixture was brought up to 60°C and stirred for 2 hours to emulsify the vinyl chloride. Trichloroethylene-lauroyl peroxide was added and polymerization was conducted for 8½ hours. The polymeric slurry was filtered, washed and dried. Reactor walls, were also observed for determination of buildup.

RUN F

Delayed Initiation and Incremental Addition of Surface Active Agents

In preparation of another batch the same formulation used in Run (E) above, was also employed herein. The monomer was also first pre-emulsified with the aid of a seed polymer, cation and surfactant before initiating polymerization. However, during polymerization a solution containing 0.1 parts "Sulframin" −85 in 0.7 parts water was added at 4 and 6 hours of the 8½ hour cycle. The final polymeric material was isolated, etc. Reactor walls were observed for polymer buildup.

RUN G

Conventional Polymerization without Preemulsification and Delayed Initiation Another batch was prepared under the same conditions using the identical charge as in Runs (E) and (F). However, all ingredients were added to the reactor including the initiator without first emulsifying the monomer. Cycle time was 8.75 hours.

Comparison between Runs E–G are shown in Table III below:

TABLE III

| RUN | E | F | G |
|---|---|---|---|
| Median particle size | 85% <37μ | 92% <37μ | 177μ |
| Bulk density (lbs/ft³) | 17.2 | 21 | 15.3 |
| Observations | Control of polymerization temperatures satisfactory, but some *"crusting" and **"chunk" formation | Temperature control excellent, no crust or chunk formation | Polymerization temperature difficult to control due to heavy crusting and chunk formation |

*Behavior pattern of a polymerizing reaction mixture producing an extreme surge in viscosity which prevents heat removal from polymerizing particles.
**Large size polymer aggregates occuring due to high viscosity and poor heat removal.

Table III demonstrates that median particle size is greatly reduced by the practice of pre-emulsification and postaddition of initiator-catalyst (Runs (E) and F). Furthermore, addition of surface active agent during polymerization (Run F) eliminates "crusting" and "chunk" formation.

EXAMPLE IV

A 1.5 liter glass reactor was charged in the following order:

| | | phr | |
|---|---|---|---|
| | RUN | H | I |
| 1. | Water | 230.0 | 230.0 |
| 2. | Sulframin 85 | 0.09 | 0.0 |
| 3. | Mono-basic Calcium phosphate, aqueous solution (10% by weight) | 0.26 | 0.0 |
| 4. | "Geon" 450×3 copolymer latex | 1.10 | 1.10 |
| 5. | Lauroyl peroxide | 0.16g | 0.16g |
| 6. | Vinyl chloride | 100.0 | 100.0 |

Ingredients 1–4 of Runs (H) and (I) were mixed. The compositions were allowed to stand overnight. The latex of Run (H) coagulated completely whereas no coagulation occurred in (I). When monomer was added to (H) the coagulated polymer swelled and dissolved in the monomer and emulsified upon heating to 57°C. Run I was heated to 60°C, but no emulsification occurred. Both compositions were polymerized at about 60°C for 24 hours. Results are shown in Table IV below.

TABLE IV

| RUN | H | I |
|---|---|---|
| Viscosity of batch | High | Low |
| Median particle size (microns) | 250 | 295 |
| Bulk density (lbs/ft³) | 24.6 | 27.9 |

Results from the foregoing example indicate that pre-emulsification of monomer will occur only when the seed polymer (dispersion) has been first coagulated through use of polyvalent metal ions, and in their absence latex seed polymer alone is not sufficiently soluble in the monomer to prompt emulsification.

EXAMPLE V

Vinyl Chloride-Propylene Copolymer

A 1.5 liter Chemco glass PVC reactor was charged with the following:

| | phr |
|---|---|
| Water | 200.0 |
| Sulframin −85 | 0.9 |
| Monobasic calcium phosphate | 0.26 |
| Geon 450×3 copolymer | 1.10 |
| After evacuation to remove oxygen the following was added: | |
| Vinyl chloride | 95.0 |
| Propylene | 5.0 |

The mixture was brought to 60°C, the desired reaction temperature. The monomeric mixture was then emulsified by stirring at 1,050 rpm for 10 minutes and then reduced to 550 rpm while adding 0.5 parts t-butyl peroxypivalate to initiate polymerization. During the 16 hour cycle a dilute solution containing 0.1 parts Sulframin 85 dissolved in 20.0 parts water was continuously added. At completion of the cycle the vinyl chloridepropylene slurry was filtered, washed and dried in the usual method to provide 84% conversion with an average particle size of 53 microns and a bulk density of 22.2 lbs/ft³.

EXAMPLE VI

Vinyl Chloride-Vinyl Acetate Copolymer

A 1.5 liter glass reactor was charged with the following:

| RUN | phr | |
|---|---|---|
|  | J | K |
| Water | 200.0 | 200.0 |
| Sulframin 85 | 0.045 | 0.045 |
| CaCl₂ | 0.075 | 0.075 |
| Geon 450×3 | 0.0 | 1.0 |
| Lauroyl peroxide | 0.2 | 0.2 |
| Vinyl chloride | 94.0 | 94.0 |
| Vinyl acetate | 6.0 | 6.0 |

Runs (J) and (K) were each prepared according to the method of Example I, Run A, whereby the monomers were first emulsified and then polymerized at 65°C by after addition of catalyst. The vinyl chloride-vinyl acetate copolymer slurries, after 6 hours, were filtered, washed and dried. Results for each composition are provided in Table V.

TABLE V

| RUN | J | K |
|---|---|---|
| Median particle size (microns) | 840 | 340 |
| % Vinyl Acetate in copolymer | 4.9 | 3.9 |

Table V demonstrates that attempted pre-emulsification without use of polymer seed followed by initiation will not provide polymeric materials with reduced particle size (Run J), and that only when pre-emulsification and delayed initiation are employed in combination with a seed polymer can particle size be reduced.

EXAMPLE VII

Polyvinyl chloride compositions were prepared according to the method of Example III, Run (F) (pre-emulsification, delayed-initiation and addition of surfactant during polymerization). The only variation lies in the quantity of polymer seed used in each run.

| RUN | L | M | N | O |
|---|---|---|---|---|
| Geon 450×3 (phr) | 0.0 | 0.25 | 0.50 | 1.10 |
| Median particle size (microns) | 149 | 149 | 88 | 37 |
| Bulk density (lbs/ft³) | 19.9 | 18.6 | 19.7 | 20.7 |

Example VII illustrates that polymer granule size is inversely proportional to the quantity of polymer seed added for pre-emulsification of the monomer.

While the invention has been described in conjunction with specific examples thereof, this is illustrative only. Accordingly, many alternatives, modifications and variations will be apparent to those skilled in the art in light of the foregoing description and it is therefore intended to embrace all such alternatives, modifications and variations as to fall within the spirit and broad scope of the appended claims.

We claim:

1. A process for preparing vinyl chloride based polymers selected from the group consisting of vinyl chloride homopolymers and copolymers containing vinyl chloride as the major constituent by suspension polymerization, which comprises:

a. pre-emulsifying a vinyl chloride based monomer(s) to form a stable dispersion of the monomer in an aqueous mixture in the absence of a polymerization initiator at temperatures ranging from about 30° to about 75°C with agitation, said aqueous mixture comprising a polyvalent metal ions selected from the group consisting of zirconium, magnesium, calcium, zinc, strontium, aluminum, lead, antimony, tin, barium and cadmium, in an amount in the range from about 0.01 to about 0.30 parts of said polyvalent metal ion per hundred parts monomer(s); a surface active agent in an amount in the range from about 0.01 to about 0.30 parts per hundred parts monomer(s); and a polymer seed selected from the group consisting of homopolymers of styrene, vinyl acetate and methacrylate, copolymers of vinyl acetate-ethylene, vinyl chloride-2-ethyl hexyl acrylate and vinyl chloride-vinyl isobutyl ether and carboxylated terpolymers of vinyl chloride-2-ethyl hexyl acrylate and the similar polymers which are soluble in the monomer(s) and are capable of stabilizing the emulsion, in an amount in the range from about 0.2 to about 2.0 parts of said polymer seed per hundred parts monomer(s), b. initiating the suspension polymerization of the stabilized, monomer-containing emulsion to form the polymer in the presence of a free-radical initiator in an amount in the range from about 0.05 to about 0.5 parts of said initiator per hundred parts monomer(s), and c. recovering the polymer product by filtration.

2. The process of claim 1 wherein the polymer seed is a latex dispersion coagulated in-situ in the aqueous mixture contemporaneously with emulsification of the monomer to substantially dissolve the coagulated latex in the monomer.

3. The process of claim 1 wherein a surface active agent is incorporated into the emulsion during polymerization of the stabilized monomer-containing emulsion.

4. The process of claim 3 wherein the surface active agent is incorporated incrementally into the emulsion during polymerization.

5. The process of claim 1 wherein the vinyl chloride based monomer(s) are vinyl chloride, vinyl chloride and ethylene, vinyl chloride and propylene, vinyl chloride and vinyl acetate or vinyl chloride and isobutylene.

6. The process of claim 1 wherein the vinyl chloride based polymer is polyvinyl chloride.

7. The process of claim 1 wherein the vinyl chloride based polymer is vinyl chloride-propylene copolymer having from about 90 to about 99 percent by weight vinyl chloride and a propylene content of about 1 to about 10 percent by weight, an intrinsic viscosity of about 0.3 to about 1.5 dl/g. and a melt flow rate of at least 0.1 dg/min.

8. The process of claim 1 wherein the polyvalent metal ion is calcium.

9. The process of claim 1 wherein the polymer seed is a copolymer of vinyl chloride-2-ethyl hexyl acrylate.

10. The process of claim 1 wherein the polymer seed is a copolymer of vinyl chloride-vinyl isobutyl ether.

11. The process of claim 1 wherein the polymer seed is a vinyl chloride-2-ethyl hexyl acrylate-carboxylated terpolymer.

12. The process of claim 1 wherein a surface active agent employed in the pre-emulsification of monomer is an anionic type.

13. A process for preparing polyvinyl chloride or vinyl chloride-propylene copolymers having from about 90 to about 99 percent by weight vinyl chloride and a propylene content of about 1 to about 10 percent by weight by suspension polymerization which comprises
  a. pre-emulsifying the monomer(s) to form a stable dispersion of the monomer in an aqueous mixture in the absence of a polymerization initiator at temperatures ranging from about 30° to about 75°C with agitation, said aqueous mixture comprising polyvalent metal ions selected from the group consisting of zirconium, magnesium, calcium, zinc, strontium, aluminum, lead, antimony, tin, barium and cadmium, in an amount in the range from about 0.01 to about 0.30 parts of said polyvalent metal ion per hundred parts monomer(s); and anionic surface active agent in an amount in the range from about 0.01 to about 0.30 parts per hundred parts monomer(s); and a polymer latex selected from the group consisting of homopolymers of styrene, vinyl acetate and methacrylate, copolymers of vinyl acetate-ethylene, vinyl chloride-2-ethyl hexyl acrylate and vinyl chloride-vinyl isobutyl ether and carboxylated terpolymers of vinyl chloride-2 ethyl hexyl acrylate and the similar polymers which are soluble in the monomer(s) and are capable of stabilizing the emulsion in an amount in the range from about 0.2 to about 2.0 parts of said polymer seed per hundred parts monomer(s),
  b. coagulating the polymer latex in-situ in the aqueous mixture contemporaneously with emulsification of the monomer to substantially dissolve the coagulated latex in the monomer(s),
  c. initiating the suspension polymerization of the stabilized monomer-containing emulsion to form the polymer in the presence of a free-radical initiator in an amount in the range from about 0.05 to about 0.5 parts of said initiator per hundred parts monomer(s),
  d. incorporating a surface active agent into the emulsion during said suspension polymerization, and
  e. recovering the polymer product by filtration.

14. The process of claim 13 wherein the polyvalent metal ion is calcium and the polymer latex is a copolymer of vinyl chloride-2-ethyl hexyl acrylate.

15. The process of claim 13 wherein polymerization (c) is initiated with a catalyst selected from the group consisting essentially of t-butyl peroxy pivalate and t-butyl perneodecanoate.

16. The process of claim 15 wherein the polymer prepared is polyvinyl chloride.

17. The process of claim 15 wherein the polymer prepared is vinyl chloride-propylene copolymer.

* * * * *